(12) United States Patent
Woodard (10) Patent No.: US 11,406,087 B2
(45) Date of Patent: Aug. 9, 2022

(54) EMERGENCY QUICK DEPLOY FULL BODY BEE SUIT

(71) Applicant: Eric C. Woodard, Winston Salem, NC (US)

(72) Inventor: Eric C. Woodard, Winston Salem, NC (US)

( * ) Notice: Subject to any disclaimer, the term of this patent is extended or adjusted under 35 U.S.C. 154(b) by 342 days.

(21) Appl. No.: 16/805,062

(22) Filed: Feb. 28, 2020

(65) Prior Publication Data

US 2021/0267175 A1    Sep. 2, 2021

(51) Int. Cl.
*A01K 55/00* (2006.01)
*A44B 19/26* (2006.01)
*A41D 13/00* (2006.01)

(52) U.S. Cl.
CPC ............ *A01K 55/00* (2013.01); *A41D 13/001* (2013.01); *A41D 13/0002* (2013.01); *A44B 19/26* (2013.01)

(58) Field of Classification Search
CPC .... A41D 13/00; A41D 13/002; A41D 13/001; A41D 13/02; A41D 15/00; A41D 15/04; A41D 2400/44; A41D 2400/70; A01K 55/00
USPC ....... 2/4, 69, 69.5, 70, 71, 72, 84, 206, 207, 2/455, 456, 457, 458; 135/902
See application file for complete search history.

(56) References Cited

U.S. PATENT DOCUMENTS

| | | | |
|---|---|---|---|
| 1,014,653 A * | 1/1912 | Kronenberger | 2/84 |
| 3,355,230 A * | 11/1967 | Trexler | A61G 10/005 55/385.2 |
| 4,485,489 A * | 12/1984 | Pilie | G21F 7/005 2/457 |
| 4,507,805 A * | 4/1985 | Calutoiu | A41D 15/04 5/413 R |
| 4,685,152 A | 8/1987 | Heare | |
| 5,172,712 A | 12/1992 | Robinson | |
| 9,532,615 B2 | 1/2017 | Radefeldt | |
| 9,848,595 B1 | 12/2017 | Del Toro | |
| 2006/0277667 A1 * | 12/2006 | Plut | A41D 13/1218 2/455 |
| 2009/0249527 A1 * | 10/2009 | Hunte | A45F 4/12 2/84 |
| 2017/0360119 A1 * | 12/2017 | Myerscough | A41D 13/0002 |
| 2018/0289079 A1 * | 10/2018 | Peterson | A45F 4/12 |

FOREIGN PATENT DOCUMENTS

| | | |
|---|---|---|
| JP | 2010203009 A | 9/2010 |
| JP | 2018053395 A | 4/2018 |

\* cited by examiner

*Primary Examiner* — Jameson D Collier
*Assistant Examiner* — Matthew R Marchewka (57) ABSTRACT

An emergency quick deploy full body bee suit has a full body suit with a torso portion, a pair of leg portions, and an ingress opening, in addition to a skirt, a weight, a suit fastening mechanism, and a skirt fastening mechanism. The ingress opening traverses into the full body suit through the lower end of the torso portion and the pair of leg portions. The skirt is removably attached external to the full body suit around the ingress opening, and has a weight connected around a lower skirt opening. A user may enter the suit through the ingress opening and the lower skirt opening, close the lower skirt opening with the skirt fastening mechanism, fully enter the full body suit, close the ingress opening with the suit fastening mechanism, remove the skirt, and is then free to move away from danger posed by any stinging insects.

18 Claims, 11 Drawing Sheets

EMERGENCY QUICK DEPLOY FULL BODY BEE SUIT

FIELD OF THE INVENTION

The present invention relates generally to protective garments. More particularly, the present invention relates to emergency full-body protection against bee stings.

BACKGROUND OF THE INVENTION

The Africanized bee, also known as the Africanized honey bee, and known colloquially as the "killer bee", is a hybrid of the western honey bee species, produced originally by cross-breeding of the East African lowland honey bee with various European honey bees such as the Italian honey bee and the Iberian honey bee. The Africanized honey bee was first introduced to Brazil in 1956 in an effort to increase honey production, but 26 swarms escaped quarantine in 1957. Since then, the hybrid has spread throughout South America and arrived in North America in 1985, and is considered an invasive species in the Americas.

Africanized bees are typically much more defensive than other varieties of honey bee, and react to disturbances faster than European honey bees. Africanized bees, as opposed to other Western bee types, guard their hives aggressively, with a larger alarm zone around the hive, have a higher proportion of "guard" bees within the hive, and deploy in greater numbers for defense and pursue perceived threats over much longer distances from the hive. They can chase a person a quarter of a mile (400 m); they have killed some 1,000 humans, with victims receiving ten times more stings than from European honey bees. They have also killed horses and other animals.

The venom of an Africanized bee is the same as that of a European honey bee, but since the former tends to sting in far greater numbers, deaths from Africanized bees are naturally more numerous than from European honey bees. The generally accepted number of stings to kill a person is approximately 10 to 11 stings per pound of body weight, meaning a 160-pound person could die from around 1,600 to 1,760 stings in a short period of time. A person allergic to bee stings could succumb much earlier due to anaphylaxis. If an Africanized bee hive is disturbed, the offending party may find themselves swarmed by up to 15,000 bees within fifteen seconds, posing a sudden and deadly threat to any victims in the immediate area.

With such a deadly threat posed by Africanized bees, any person risking an encounter with them should be well-prepared. Since the defensive response of an Africanized bee hive can be so rapidly lethal, anyone expecting an encounter should wear a protective full-body suit. However, such suits may be cumbersome in performing various other types of field work or other activities, and may not be practical to wear at all times. Furthermore, current bee suits are time-consuming to enter and properly seal, and may require a partner to assist in doing so. However, it is still prudent to prepare for the possibility of an encounter with Africanized bees. Therefore, a portable, quickly deployable solution is desired.

As such, it is the objective of the present invention to provide a quick-deploy emergency bee suit for rapid protection in case of an attack from Africanized bees or other stinging insects. Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is an emergency quick deploy full body bee suit for rapid bodily protection in case of an attack by Africanized bees or other swarming insects.

In general, referring to FIGS. 1-7, the present invention comprises a full body suit 1 comprising a torso portion 10, a hood 11, a pair of arm portions 12, a pair of leg portions 13, a pair of gloves 14, a pair of foot portions 15, and an ingress opening 16. The present invention further comprises a skirt 2, a weight 3, a suit fastening mechanism 4, and a skirt fastening mechanism 5. In the preferred embodiment of the present invention, the full body suit 1 and a skirt 2 are each constructed of a durable cotton-polyester material blend, as is typical for bee suits. However, the specific material of the present invention may vary as desired in different embodiments and should generally be understood to be suited to protecting a user against insect stings and intrusion of insects into the full body suit 1. The full body suit 1 offers protection against insect stings and incursion of insects to the full extent of the body of the user.

The torso portion 10 extends between an upper torso end 101 and a lower torso end 102, while the skirt 2 similarly extends between an upper skirt end 21 and a lower skirt end 22. The skirt 2 further comprises a lower skirt opening 23 traversing into the skirt 2 through the lower skirt end 22. The hood 11 is connected to the upper torso end 101. The pair of arm portions 12 is connected to the torso portion 10 adjacent to the upper torso end 101 and positioned laterally opposite each other along the torso portion 10, and each of the pair of gloves 14 is connected to one of the arm portions opposite the torso portion 10. The pair of leg portions 13 is connected to the lower torso end 102 and positioned laterally opposite each other along the torso portion 10, and each of the pair of foot portions 15 is connected to one of the pair of leg portions 13 opposite the torso portion 10. The gloves and foot portions each fully enclose the user's hands and feet while in use.

Figure 5:
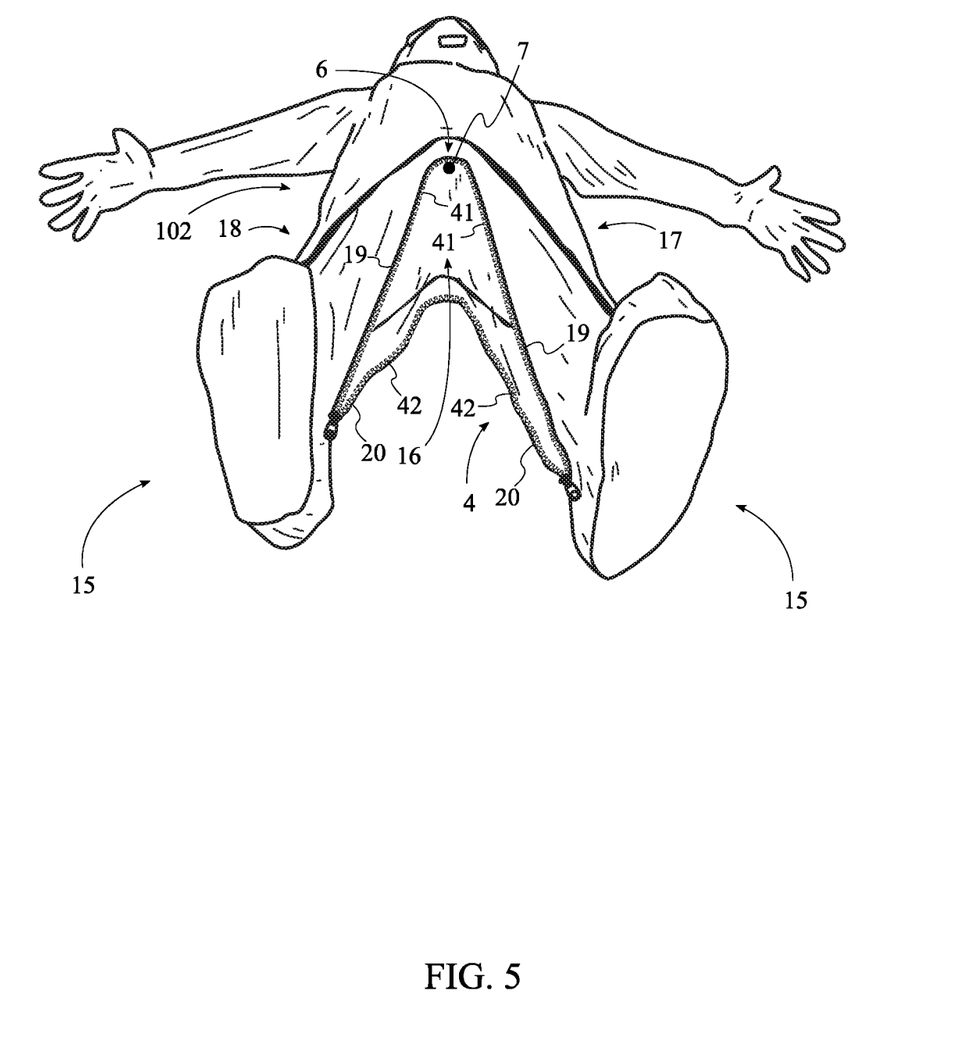
FIG. 5 is a lowered front view of the full body suit showing the ingress opening, wherein the suit fastening mechanism is in an opened configuration.

As seen in FIG. 5, the ingress opening 16 traverses from the lower torso end 102 along the pair of leg portions 13 toward the pair of foot portions 15. To deploy the present invention, a user enters the full body suit 1 head-first through the ingress opening 16, located at the crotch of the full body suit 1 and traversing down the leg portions.

Figure 7:
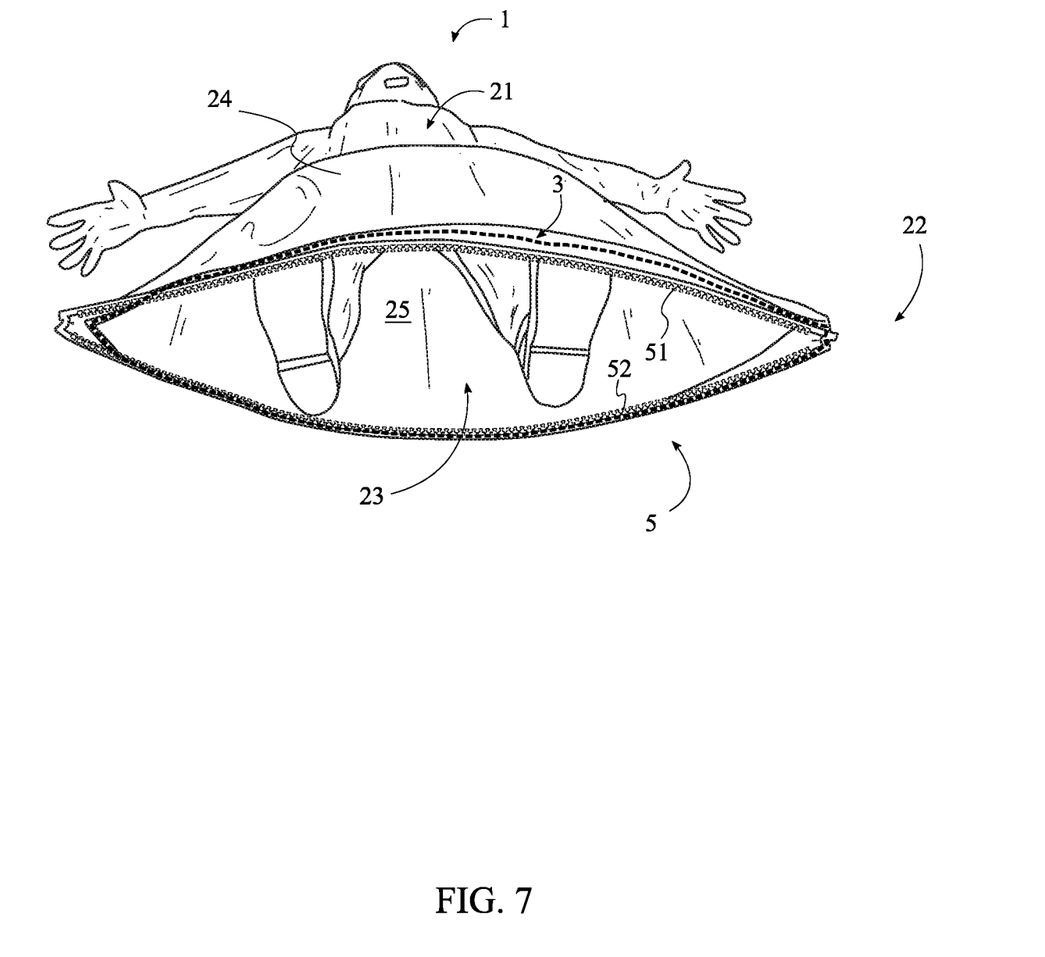
FIG. 7 is a lowered front view of the suit attached to the full body suit showing the lower skirt opening, wherein the skirt fastening mechanism is in an opened configuration.
Figure 8:
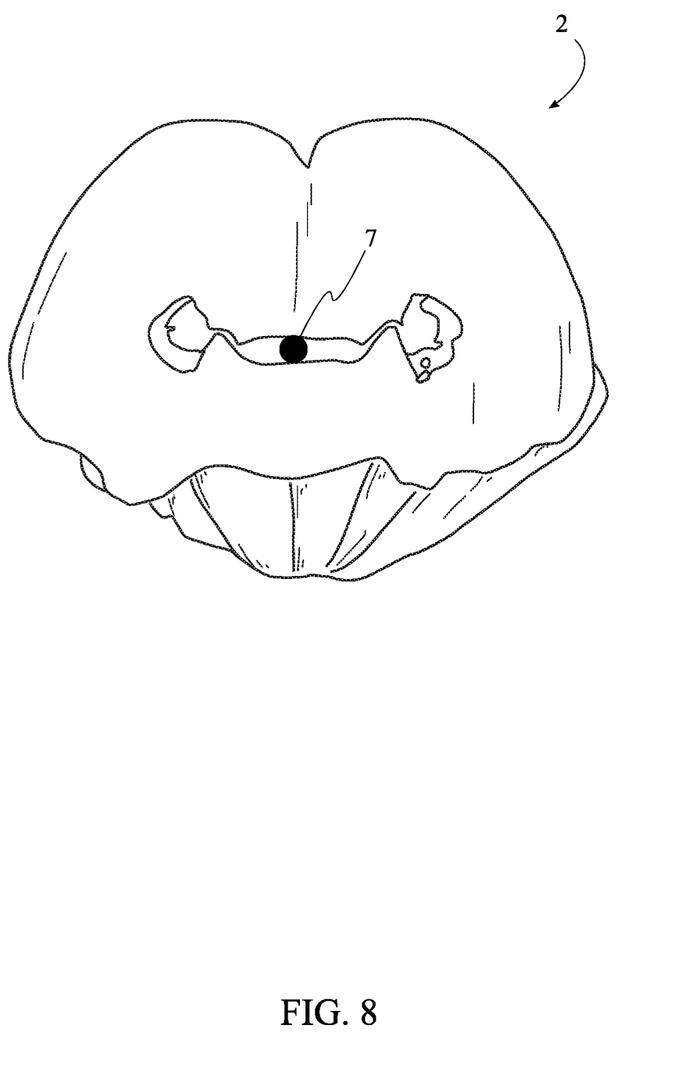
FIG. 8 is a sectional view along line A-A of FIG. 1, wherein the suit fastening mechanism is in a closed configuration.
Figure 9:
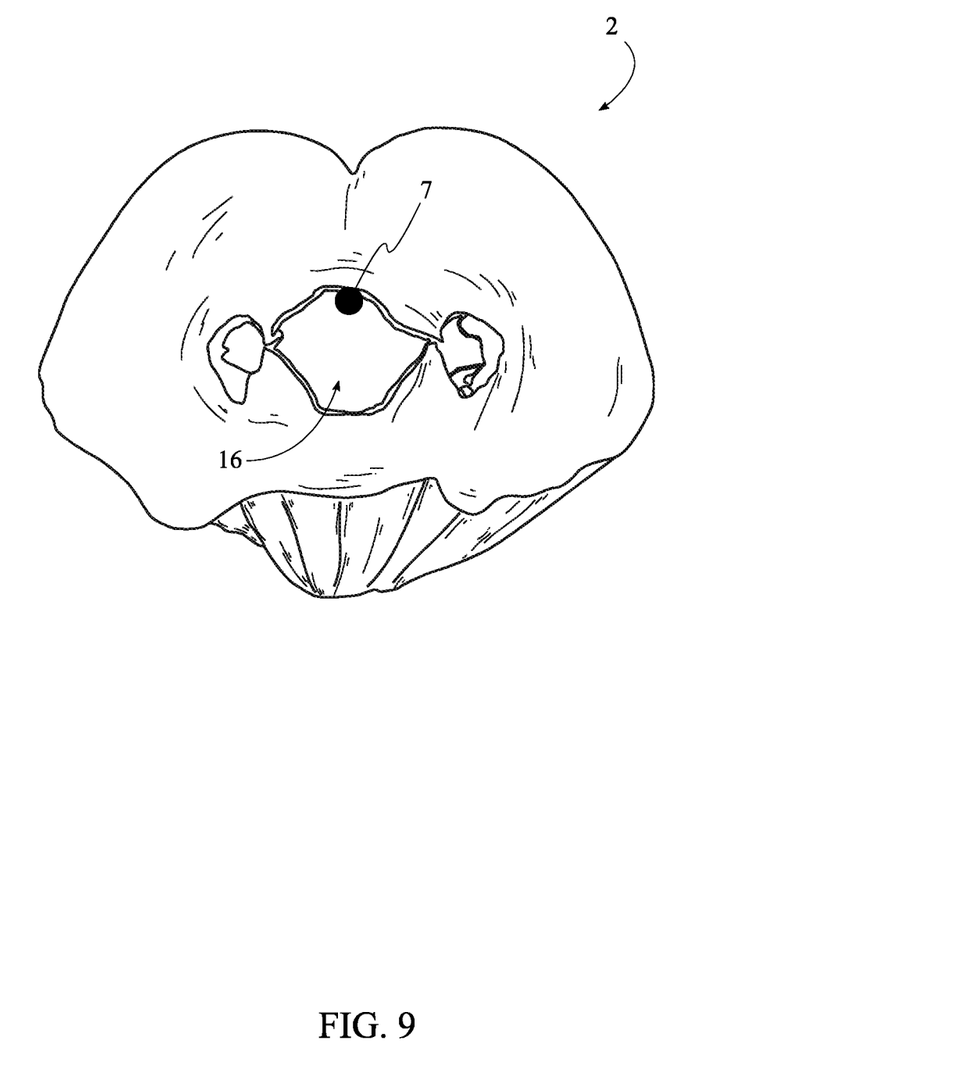
FIG. 9 is a sectional view along line A-A of FIG. 1, wherein the suit fastening mechanism is in an opened configuration.

Before and during deployment, the skirt 2 is removably and externally attached to the full body suit 1 adjacent to the lower torso end 102 and around the pair of leg portions 13, wherein the ingress opening 16 is surrounded by the skirt 2. Furthermore, the weight 3 is connected to the lower skirt end 22, as shown in FIG. 7.

In order for the user to enter the full body suit 1 through the ingress opening 16, the user must first or simultaneously pass through the lower skirt opening 23. Typically, the user will hold the present invention above their head and drop the lower skirt end 22 and ingress opening 16 down over their body. After the user is sufficiently within the bounds of the ingress opening 16 of the full body suit 1 and the lower skirt opening 23 of the skirt 2, the user may let the skirt 2 fall around their feet. In doing so, the weight 3 connected to the lower skirt end 22 weighs down the lower skirt end 22 of the skirt 2 against the ground, forming a protective barrier between the user and any swarming insects. This serves as an intermediate stage of deployment, affording the user time to fully enter the full body suit 1. However, though the weight 3 may prevent the majority of the swarming insects from entering the skirt 2, some may still find their way under the edges of the skirt 2.

As an additional protective measure, the skirt fastening mechanism 5 is perimetrically and internally connected adjacent to the lower skirt opening 23, wherein the skirt fastening mechanism 5 is configured to close the lower skirt opening 23. It is contemplated that in various embodiments, the skirt fastening mechanism 5 may vary in nature. However, in the preferred embodiment, the skirt fastening mechanism 5 is a zipper mechanism. In other embodiments, any other suitable fastening mechanism may be utilized as the skirt fastening mechanism, such as, but not limited to, hook and loop tape, a plurality of button snaps, clasps, or other fasteners, or other means. Thus, after the user drops the weighted lower skirt end 22 to the ground, the user may then zip closed the skirt fastening mechanism 5 in order to close the lower skirt opening 23 and further ensure against any ingress of swarming insects.

Figure 4:
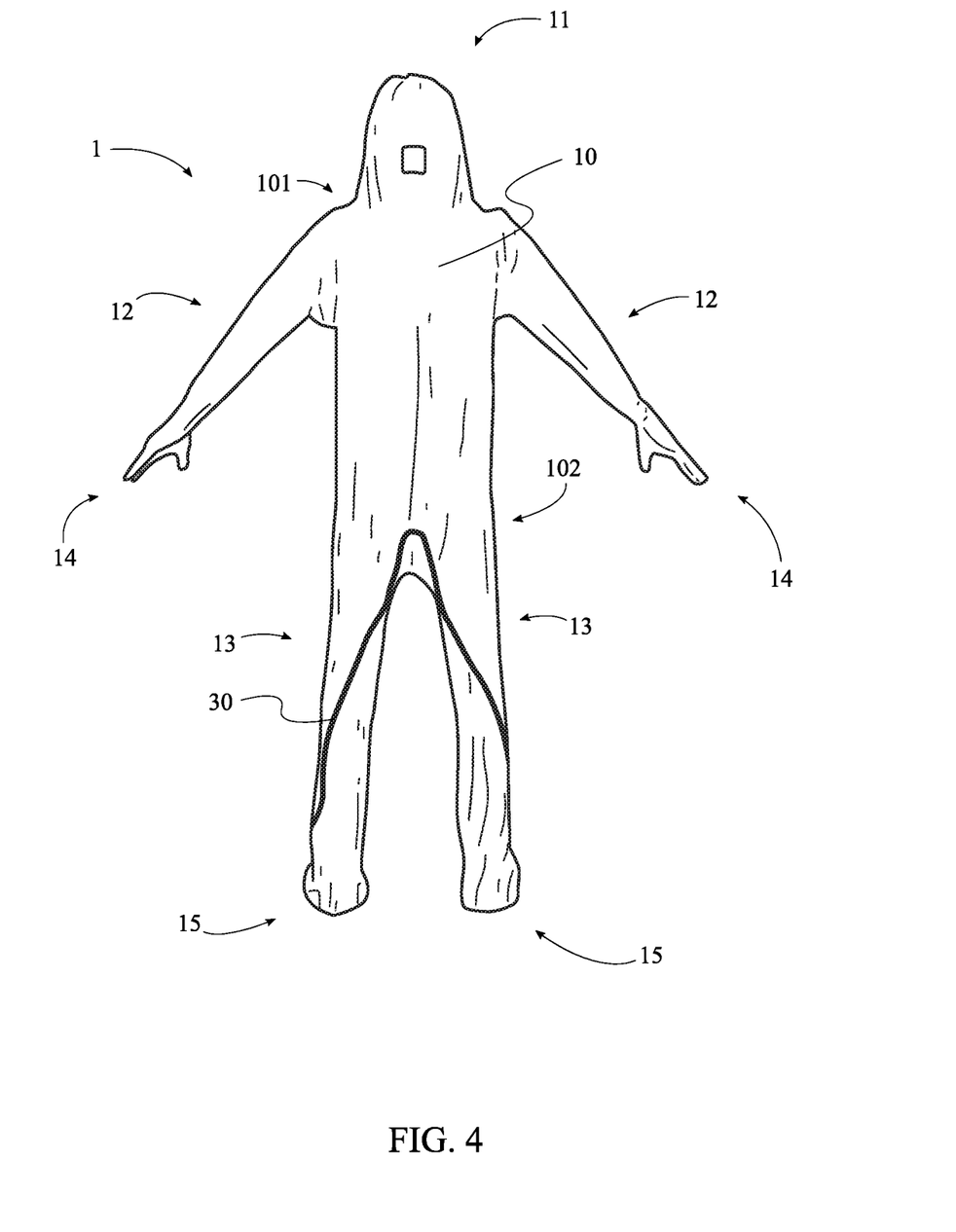
FIG. 4 is a rear front view of the full body suit of the present invention.
Figure 10:
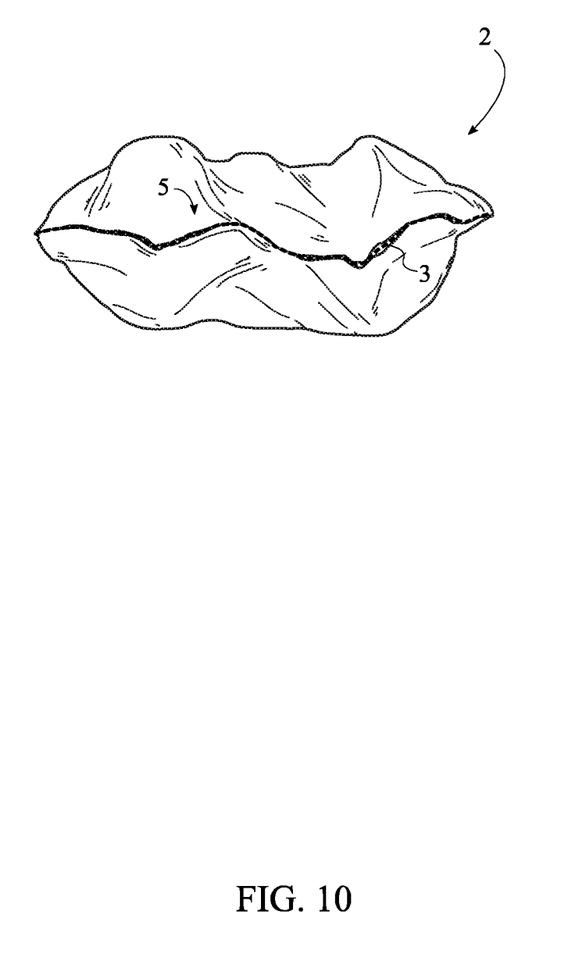
FIG. 10 is a bottom view of the skirt with the skirt fastening mechanism being in a closed configuration.

After securely closing the skirt 2, the user continues to enter the full body suit 1 and inserts their feet and legs into the pairs of foot portions and leg portions, respectively. The suit fastening mechanism 4 is perimetrically connected adjacent to the ingress opening 16, wherein the suit fastening mechanism 4 is configured to close the ingress opening 16, as shown in FIGS. 4-5. Similarly to the skirt fastening mechanism 5, in the preferred embodiment, the suit fastening mechanism 4 is a zipper mechanism, as shown in FIG. 7. Thus, after the user's feet and legs are adequately positioned within the pair of foot portions 15 and leg portions, the user zips up the suit fastening mechanism 4, fully enclosing themselves in the full body suit 1. A bottom view of the skirt 2 with the skirt fastening mechanism 5 closed is shown in FIG. 10. The user then inserts their hands and arms into the pairs of gloves and arm portion. The skirt 2 is then no longer necessary, and may be removed by the user from its attached position adjacent to the lower torso end 102 around the pair of leg portions 13. The user is then free to walk away from the danger area without being overwhelmed by stings.

Figure 1:
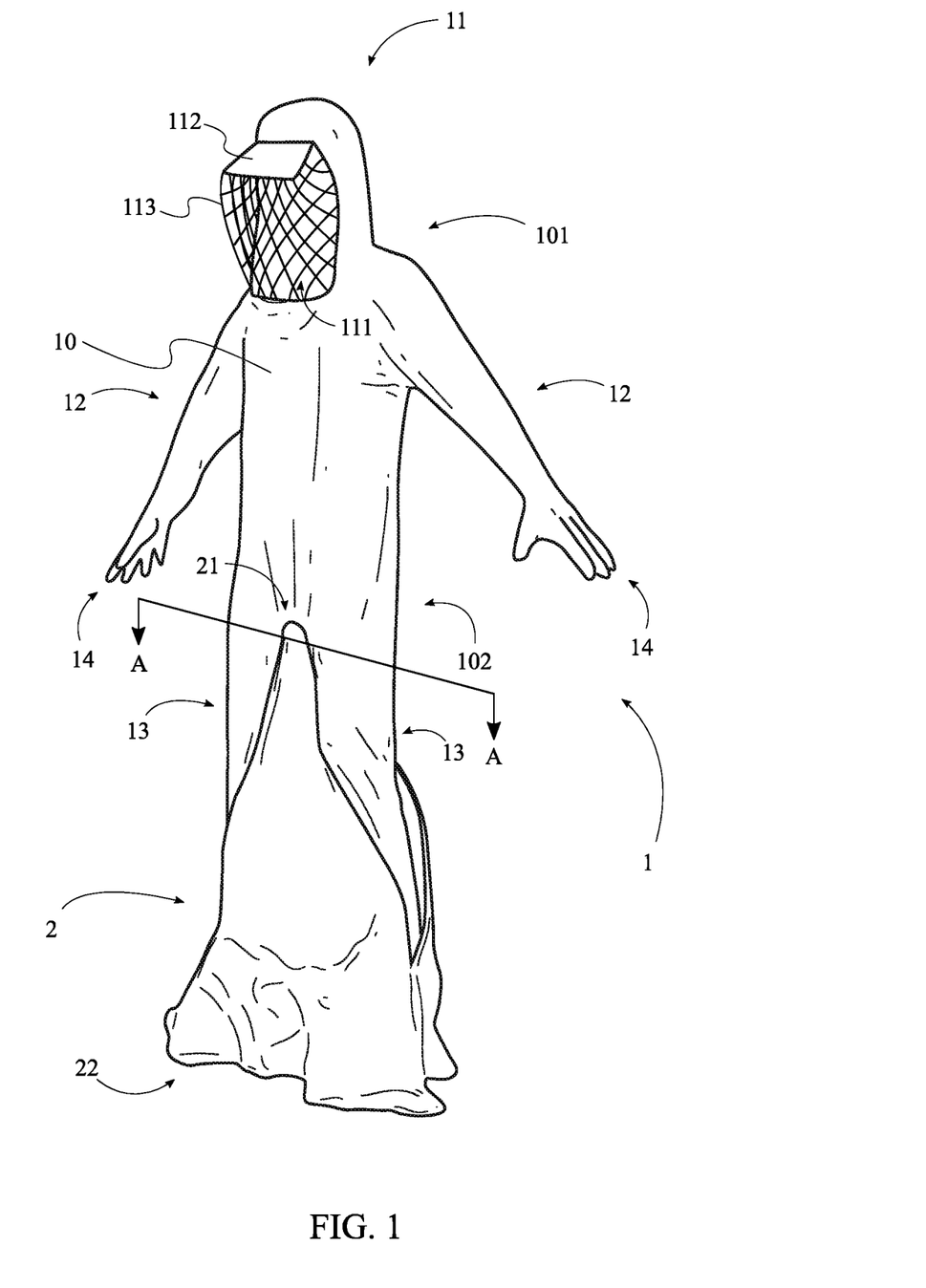
FIG. 1 is a perspective front view of the present invention with the skirt attached to the full body suit.

The hood 11 is the portion of the full body suit 1 intended to cover the user's head. In various embodiments, the hood 11 may comprise different components and configurations suited to different purposes. In some embodiments, as shown in FIG. 1, the hood 11 further comprises a frontal opening 111, a bill 112, and a mesh covering 113. The frontal opening 111 traverses into the hood 11 adjacent to the upper torso end 101.

The coverage extent of the frontal opening 111 may vary, though in some embodiments, the frontal opening 111 may correspond approximately to the typical area of a human face. The bill 112 is connected to the hood 11 adjacent to the frontal opening 111 opposite the torso end, and extends longitudinally outward from the hood 11. The mesh covering 113 is perimetrically connected along the frontal opening 111 and the bill 112, affording the user visibility and breathability while protecting their face and head area from stings. In other embodiments, the hood 11 may comprise different components and construction suitable to the spirit of the present invention.

Figure 3:
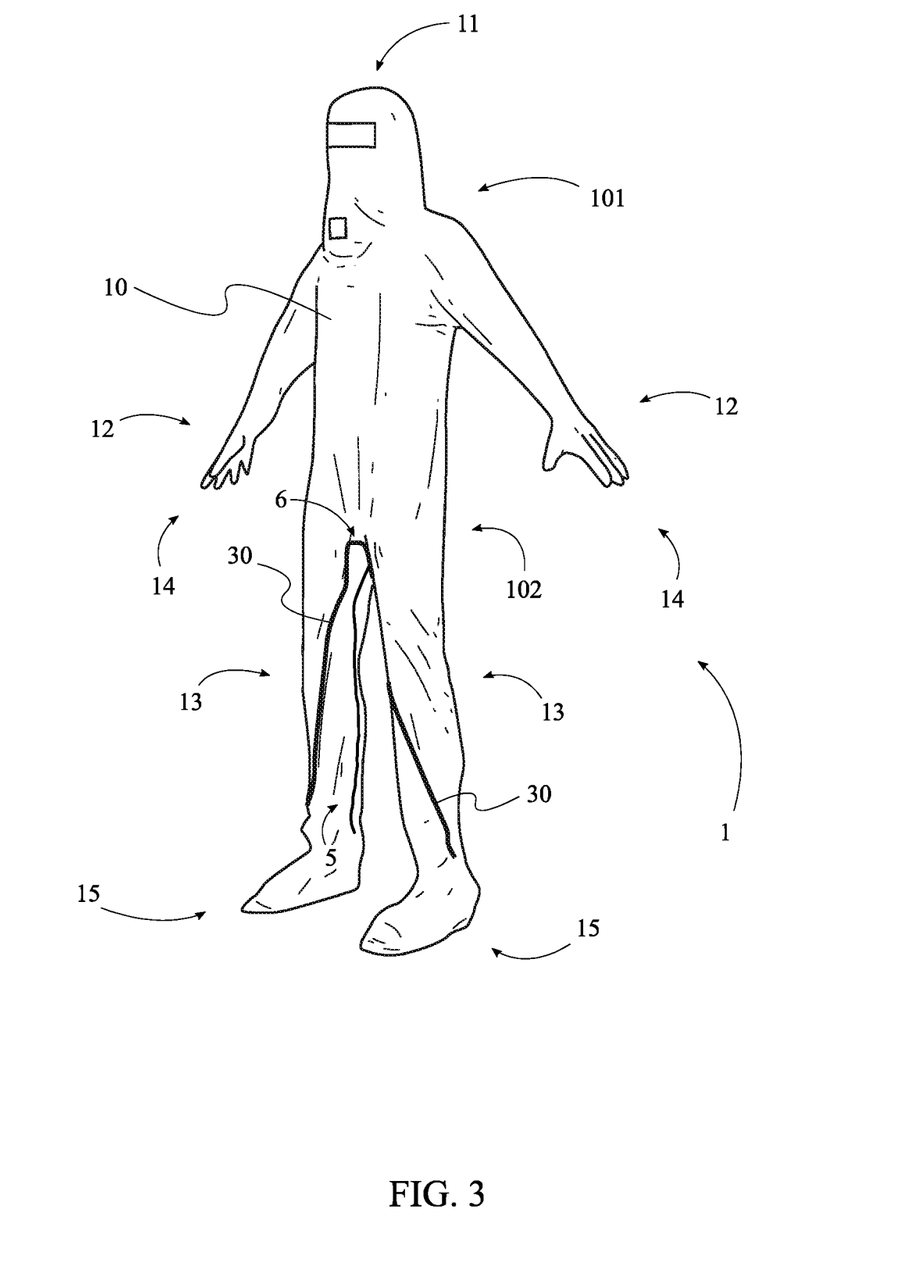
FIG. 3 is a perspective front view of the full body suit of the present invention.

As previously mentioned, the skirt 2 is removably attached to the full body suit 1 adjacent to the lower torso end 102 around the pair of leg portions 13. More particularly, the skirt 2 is perimetrically attached to the lower torso end 102 and along the pair of leg portions 13 between the upper skirt end 21 and the lower skirt end 22. The skirt 2 may be removably attached to the full body suit 1 through any suitable means, such as, but not limited to, hook and loop tape, button snaps, zippers, clasps, fasteners, or other attachment means. In the preferred embodiment, the skirt 2 is attached to the full body suit 1 through a plurality of hook and loop strips 30, as shown in FIGS. 3-4, wherein a first plurality of hook and loop strips is connected to the full body suit 1, a second plurality of hook and loop strips is connected to the skirt 2, and the first plurality of hook and loop strips is removably attached to the second plurality of hook and loop strips. The weight 3 may vary in nature; in some embodiments, the weight 3 is a link chain that is perimetrically connected along the lower skirt opening 23. In other embodiments, the weight 3 may take any other suitable form, such as, but not limited to, sand, ball bearings, metal rods, or any other arrangement or collection of material with sufficient mass to weigh the perimeter of the lower skirt end 22 to the ground to prevent ingress of insects into the interior of the skirt 2 before the user has fully entered and secured themselves within the full body suit 1. The weight 3 may be perimetrically connected adjacent to the lower skirt opening 23 through any suitable means. In some embodiments, the skirt may comprise a perimetrical hem within which the weight 3 is captured. In some embodiments, the weight 3 is affixed to the lower skirt opening 3 through one or more straps, fasteners, clasps, or other suitable connecting means.

Figure 2:
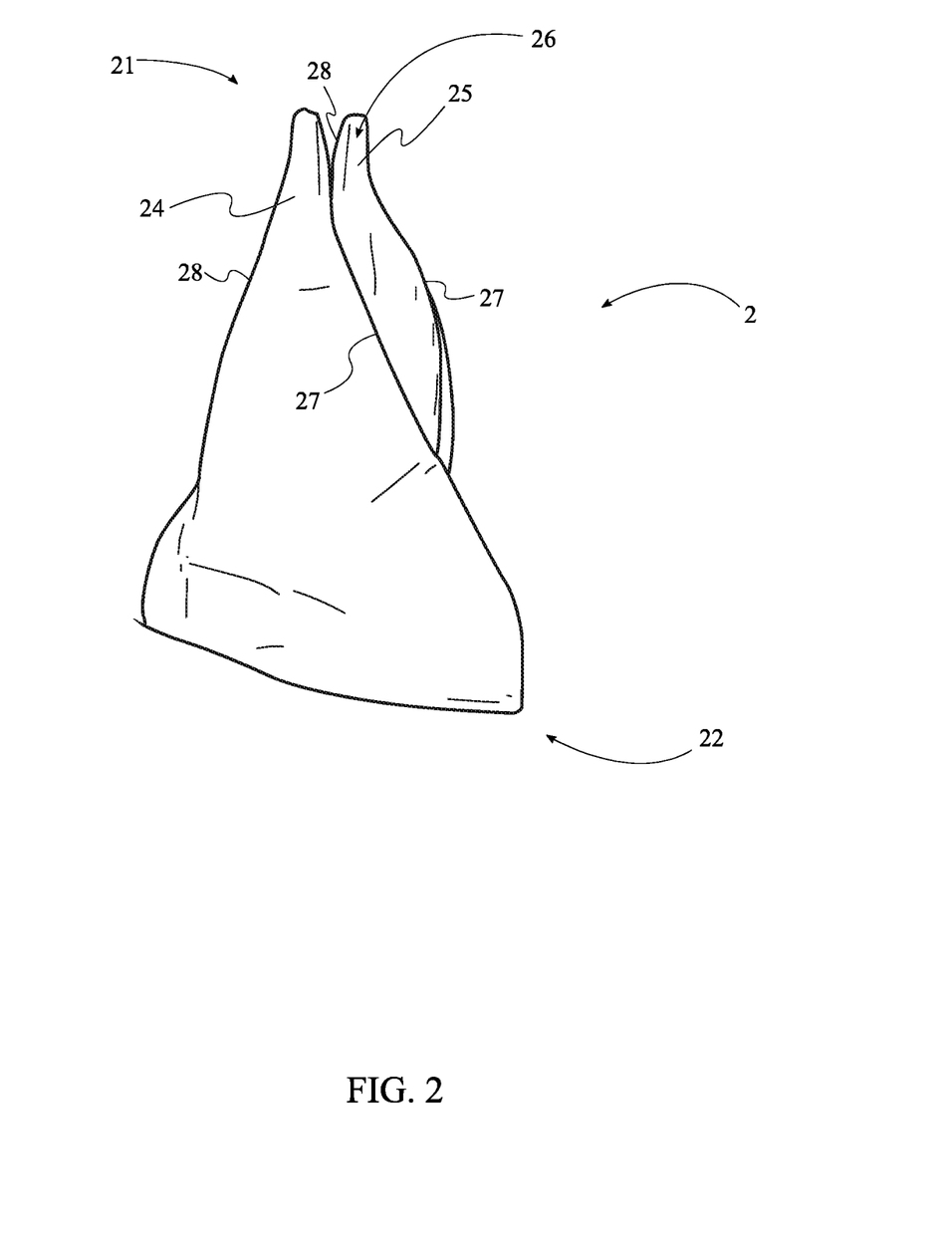
FIG. 2 is a perspective front view of the skirt of the present invention.

Referring to FIG. 2, in the preferred embodiment, the skirt 2 further comprises an anterior portion 24, a posterior portion 25, and an upper skirt opening 26. The anterior portion 24 and the posterior portion 25 are positioned longitudinally opposite each other along the skirt 2, with the upper skirt opening 26 traversing into the skirt 2 at the upper skirt end 21 toward the lower skirt end 22, such that the anterior portion 24 is separated from the posterior portion 25 adjacent to the upper skirt end 21 by the upper skirt opening 26. The anterior portion 24 and the posterior portion 25 each comprise a first lateral edge 27 and a second lateral edge 28, wherein the upper skirt opening 26 is laterally delineated by the first lateral edge 27 and the second lateral edge 28 of both the anterior portion 24 and the posterior portion 25, such that the first lateral edge 27 and the second lateral edge 28 traverse from the upper skirt end 21 toward the lower skirt end 22 for each of the anterior portion 24 and the posterior portion 25 of the skirt 2. The lateral edges of the anterior portion 24 and the posterior portion 25 of the skirt 2 attach to the exterior of the pair of leg portions 13. Furthermore, the first lateral edge 27 of the anterior portion 24 and the first lateral edge 27 of the posterior portion 25 adjoin between the upper skirt end 21 and the lower skirt end 22, and similarly the second lateral edge 28 of the anterior portion 24 and the second lateral edge 28 of the posterior portion 25 adjoin between the upper skirt end 21 and the lower skirt end 22.

Figure 6:
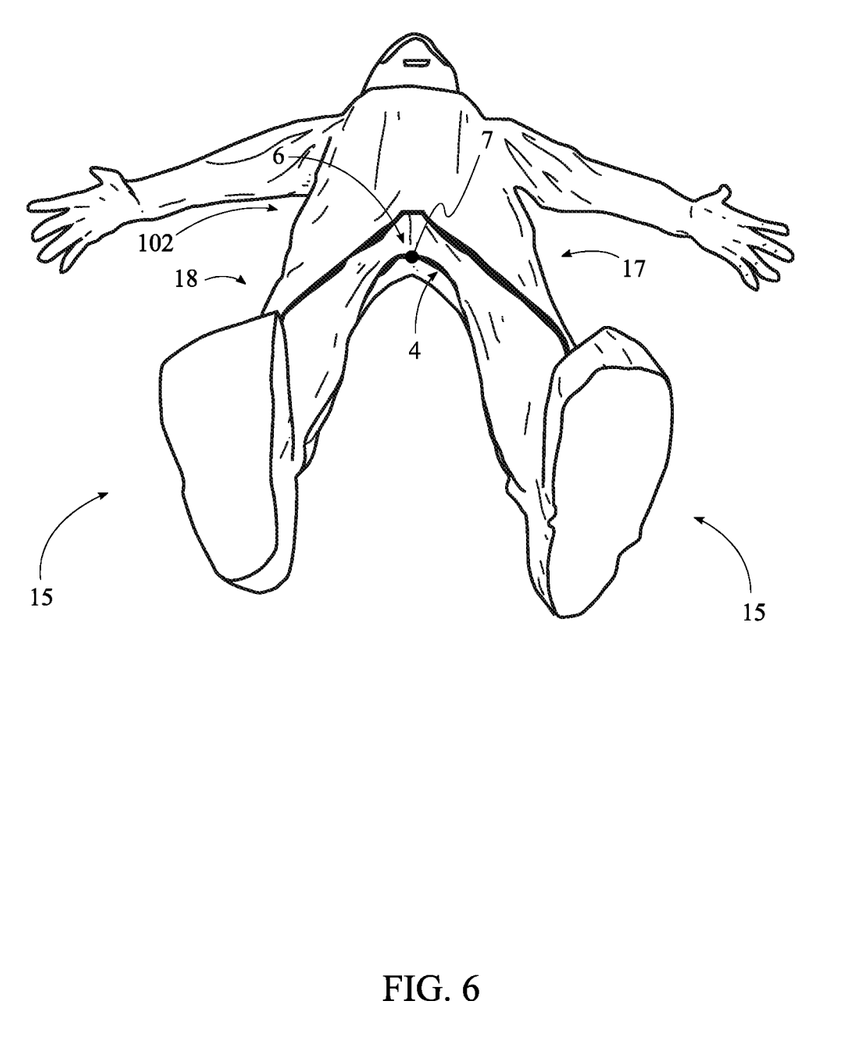
FIG. 6 is a lowered front view of the full body suit wherein the suit fastening mechanism is in a closed configuration.

More particularly, the pair of leg portions 13 comprises a first leg portion 17 and a second leg portion 18, as shown in FIGS. 5-6. The first lateral edge 27 of the anterior portion 24 and the first lateral edge 27 of the posterior portion 25 of the skirt 2 are removably attached to the full body suit 1 adjacent to the lower torso end 102 and around the first leg portion 17; more particularly, the first lateral edge 27 of the anterior portion 24 is anteriorly connected to the first leg portion 17 adjacent to the lower torso end 102, and the first lateral edge 27 of the posterior portion 2 is posteriorly connected to the first leg portion 17 adjacent to the lower torso end 102; thus, the first lateral edge 27 of the anterior portion 24 and the first lateral edge 27 of the posterior portion 25 surround the first leg portion 17 together. Similarly, the second lateral edge 28 of the anterior portion 24 and the second lateral edge 28 of the posterior portion 25 of the skirt 2 are removably attached to the full body suit 1 adjacent to the lower torso end 102 and around the second leg portion 18.

In the preferred embodiment, the first lateral edge 27 of the anterior portion 24 and the first lateral edge 27 of the posterior portion 25 of the skirt 2 are each removably attached to the full body suit 1 adjacent to the lower torso end 102 and around the first leg portion 17 through hook and loop tape; similarly, the second lateral edge 28 of the anterior portion 24 and the second lateral edge 28 of the posterior portion 25 of the skirt 2 are each removably attached to the full body suit 1 adjacent to the lower torso end 102 and around the first leg portion 17 through hook and loop tape.

As previously mentioned, the skirt fastening mechanism 5 is preferably a zipper mechanism. As such, the skirt fastening mechanism 5 comprises a first skirt zipper portion 51 and a second skirt zipper portion 52 in the preferred embodiment, as shown in FIG. 7. The first skirt zipper portion 51 and the second skirt zipper portion 52 are positioned terminally and serially adjacent to each other, wherein the first skirt zipper portion 51 and the second skirt zipper portion 52 perimetrically and internally traverse along the lower skirt opening 23, and wherein the first skirt zipper portion 51 and the second skirt zipper portion 52 are configured to be selectably engaged with each other in order to close the lower skirt opening 23.

More particularly, in some embodiments, the first skirt zipper portion 51 perimetrically and internally traverses along the lower skirt opening 23 adjacent to the anterior portion 24 of the skirt 2, and the second skirt zipper portion 52 perimetrically and internally traverses along the lower skirt opening 23 adjacent to the posterior portion 25 of the skirt 2, the first skirt zipper portion 51 and the second skirt zipper portion 52 being configured to be selectably engaged with each other in order to close the lower skirt opening 23. It is noted, however, that any positioning of the first skirt zipper portion 51 and the second skirt zipper portion 52 may be utilized, so long as engagement of the first skirt zipper portion 51 and the second skirt zipper portion 52 serves to close the lower skirt opening 23 against incursion by insects.

Though the suit fastening mechanism 4 may vary in different embodiments, in the preferred embodiment, the suit fastening mechanism 4 comprises a first pair of suit zipper portions 41 and a second pair of suit zipper portions 42, as shown in FIG. 5. The first pair of suit zipper portion and the second pair of suit zipper portions 42 are configured to be selectably engaged with each other in order to close the ingress opening 16 of the torso portion 10.

Moreover, referring to FIGS. 3, 5, and 6, a zipper apex 6 may be defined as being positioned laterally central on the torso portion 10 at the lower torso end 102, corresponding to a crotch region of the full body suit 1. Furthermore, each of the pair of leg portions 13 comprise an anterior internal edge 19 and a posterior internal edge 20, which are configured to be affixed against each other through the suit zipper portions in order to close the ingress opening 16. The anterior internal edge 19 and the posterior internal edge 20 each traverse from the torso portion 10 adjacent to the lower torso end 102 along one of the pair of leg portions 13 toward one of the pair of foot portions 15 for each of the pair of leg portions 13, wherein the ingress opening 16 is delineated by the anterior internal edges 19 and posterior internal edges 20 of the pair of leg portions 13. The anterior internal edges 19 of the pair of leg portions 13 adjoin with each other adjacent to the lower torso end 102 of the torso portion 10, and the posterior internal edges 20 of the pair of leg portions 13 similarly adjoin with each other adjacent to the lower torso end 102 of the torso portion 10.

Each of the first pair of suit zipper portions 41 is connected along the anterior internal edge 19 of one of the pair of leg portions 13, and each of the second pair of suit zipper portions 42 is connected along the posterior internal edge 20 of one of the pair of leg portions 13. Each of the first pair of suit zipper portions 41 is configured to be selectably engaged with one of the second pair of suit zipper portions 42. The first pair of suit zipper portions 41 and the second pair of suit zipper portions 42 each terminate adjacent to the zipper apex 6, wherein the ingress opening 16 is closed when the first pair of suit zipper portions 41 and the second pair of suit zipper portions 42 are engaged with each other, and wherein the first pair of suit zipper portions 41 and the second pair of suit zipper portions 42 are in a closed configuration 43 when the first pair of suit zipper portions 41 and the second pair of suit zipper portions 42 are engaged with each other.

When closing the ingress opening 16 after stepping their feet and legs into the foot portions and leg portions, the user closes the ingress opening 16 by zipping together the first pair of suit zipper portions 41 and the second pair of zipper portions 42 from a zipper starting point adjacent to the foot portions or between the foot portions and the torso portion 10 to the zipper apex 6 in the crotch area.

In order to secure the suit fastening mechanism 4 closed in embodiments wherein the suit fastening mechanism 4 utilizes zippers as discussed above, the preferred embodiment of the present invention further comprises at least one zipper anchor 7, as shown in FIGS. 4-5 and 8-9. The zipper anchor 7 is internally connected to the torso portion 10 adjacent to the zipper apex 6, wherein the zipper anchor 7 is configured to secure the first pair of suit zipper portions 41 and the second pair of suit zipper portions 42 in the closed configuration 43. In the preferred embodiment, the zipper anchor 7 acts as a physical impediment to the zippers of the suit fastening mechanism 4 coming loose from their closed positions. In some embodiments, the zipper anchor 7 is constructed of an elastically deformable material. In some embodiments, the zipper anchor 7 is an expanded polystyrene foam plug. The expanded polystyrene foam plug acts to retain the zippers of the suit fastening mechanism 4 thusly: as the zipper pulls of the suit fastening mechanism 4 are pulled toward the zipper apex 6, the expanded polystyrene foam plug presents a minor obstacle to the path of said zipper pulls. In order to finish zipping up the suit fastening mechanism 4, the user must apply some force to slightly crush or otherwise deform the expanded polystyrene foam plug a certain amount to allow the zipper pulls to pass by and ultimately reach the zipper apex 6. After the zipper pulls are zipped past the zipper anchor 7 and the deforming force on the zipper anchor 7 is released, the zipper anchor 7 returns to its undeformed state, once again presenting a barrier to the passage of zippers, but this time presenting the zipper pulls from moving away from their closed positions. Alternatively or additionally to the aforementioned arrangement, in some embodiments, the zippers of the suit fastening mechanism 4 and the zipper anchor 7 are configured in such a way that as the zipper pulls of the suit fastening mechanism 4 approach the zipper apex 6, said zipper pulls come into contact with the zipper anchor 7; as said contact occurs, the zipper pulls become pressed into the zipper anchor 7, which then functions through frictional and compressive reaction forces to retain the zipper pulls in their closed positions adjacent to the zipper apex 6. The zipper anchor 7 may be constructed of any material suitable to achieving the aforementioned functionality, or the zipper anchor 7 may alternatively comprise other means of retaining the zipper pulls of the suit fastening mechanism 4 in the closed position, such as, but not limited to, hook and loop tape, clasps, fasteners, adhesives, or other suitable means.

Figure 11:
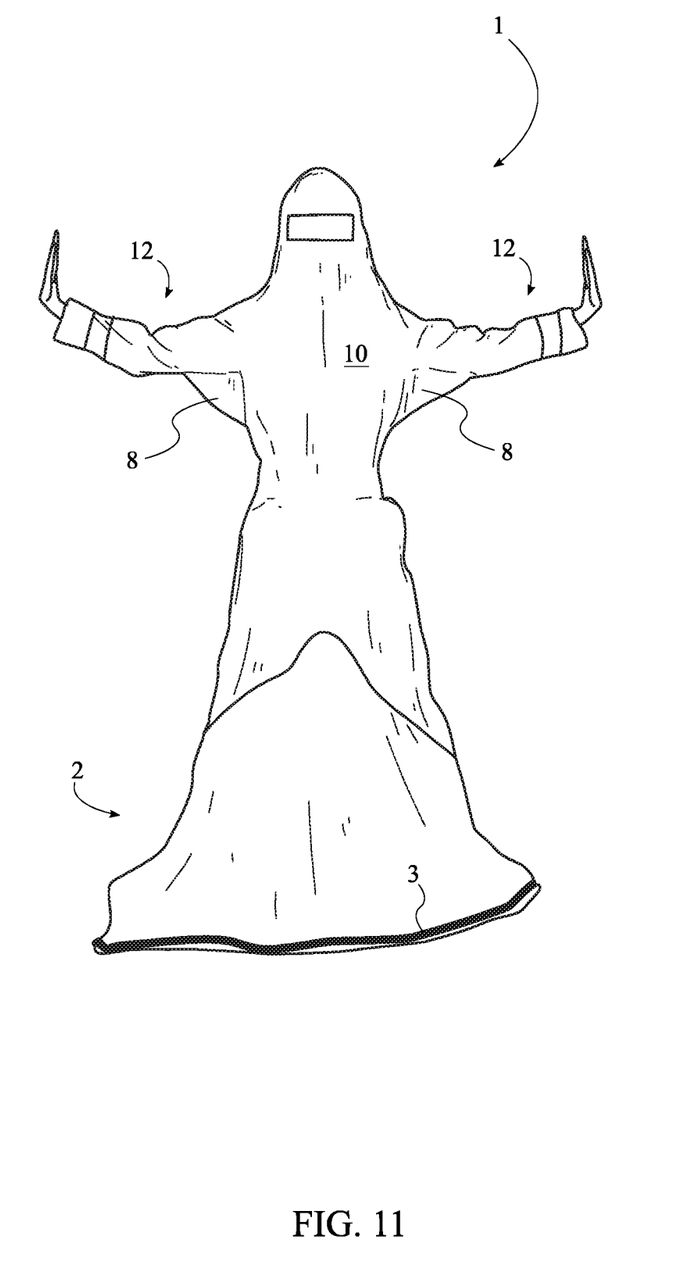
FIG. 11 is a front view of one embodiment of the present invention including a pair of flared armpit portions.

Some embodiments of the present invention further comprise a pair of flared armpit portions 8, as shown in FIG. 11. Each of the pair of flared armpit portions 8 is connected adjacent to and between one of the pair of arm portions 12 and the torso portion 10. The pair of flared armpit portions 8 afford the user more internal space within the full body suit 1 in order to more easily manipulate their arms into the pair of arm portions 12 during the process of putting on the full body suit 1.

Although the invention has been explained in relation to its preferred embodiment, it is to be understood that many other possible modifications and variations can be made without departing from the spirit and scope of the invention as hereinafter claimed.

What is claimed is:

1. An emergency quick deploy full body bee suit comprising:
   a full body suit comprising a torso portion, a hood, a pair of arm portions, a pair of leg portions, a pair of gloves, a pair of foot portions, and an ingress opening;
   a skirt;
   a weight;
   a suit fastening mechanism;
   a skirt fastening mechanism;
   the torso portion extending between an upper torso end and a lower torso end;
   the skirt extending between an upper skirt end and a lower skirt end;
   the skirt comprising a lower skirt opening;
   the lower skirt opening in fluid communication with an interior of the skirt through the lower skirt end;
   the hood being connected to the upper torso end;
   the pair of arm portions being connected to the torso portion adjacent to the upper torso end and positioned laterally opposite each other along the torso portion;
   each of the pair of gloves being connected to one of the arm portions opposite the torso portion;
   the pair of leg portions being connected to the lower torso end and positioned laterally opposite each other along the torso portion;
   each of the pair of foot portions being connected, respectively, to one of the pair of leg portions opposite the torso portion;
   the ingress opening in fluid communication with an interior of the full body suit, the ingress opening extending from the lower torso end along the pair of leg portions toward the pair of foot portions;
   the skirt being removably and externally attached to the full body suit adjacent to the lower torso end, the skirt surrounding the pair of leg portions, the pair of foot portions, and the ingress opening when the skirt is attached to the full body suit;
   the weight being connected to the lower skirt end;
   the skirt fastening mechanism being perimetrically and internally connected to the skirt adjacent to the lower skirt opening,
   wherein the skirt fastening mechanism is configured to close the lower skirt opening; and
   the suit fastening mechanism being perimetrically connected to the full body suit adjacent to the ingress opening,
   wherein the suit fastening mechanism is configured to close the ingress opening.

2. The emergency quick deploy full body bee suit as claimed in claim 1 comprising:
   the full body suit and the skirt being constructed of a cotton-polyester material blend.

3. The emergency quick deploy full body bee suit as claimed in claim 1 comprising:
   the hood comprising a frontal opening, a bill, and a mesh covering;
   the frontal opening in fluid communication with an interior of the hood, the frontal opening being positioned adjacent to the upper torso end;
   the bill being connected to the hood adjacent to the frontal opening opposite the upper torso end; and
   the mesh covering being perimetrically connected to the hood along the frontal opening and the bill.

4. The emergency quick deploy full body bee suit as claimed in claim 1 comprising:
the skirt being perimetrically attached to the lower torso end and along the pair of leg portions between the upper skirt end and the lower skirt end.

5. The emergency quick deploy full body bee suit as claimed in claim 1 comprising:
the skirt being perimetrically attached to the lower torso end and along the pair of leg portions between the upper skirt end and the lower skirt end via hook and loop tape.

6. The emergency quick deploy full body bee suit as claimed in claim 1 comprising:
the weight being a link chain; and
the link chain being perimetrically connected to the skirt along the lower skirt opening.

7. The emergency quick deploy full body bee suit as claimed in claim 1 comprising:
the skirt further comprising an anterior portion, a posterior portion, and an upper skirt opening;
the anterior portion and the posterior portion being positioned longitudinally opposite each other along the skirt;
the upper skirt opening in fluid communication with the interior of the skirt at the upper skirt end, the upper skirt opening extending toward the lower skirt end;
the anterior portion being separated from the posterior portion adjacent to the upper skirt end by the upper skirt opening;
the anterior portion and the posterior portion each comprising a first lateral edge and a second lateral edge,
wherein the upper skirt opening is laterally delineated by the first lateral edge and the second lateral edge of both the anterior portion and the posterior portion; and
the first lateral edge and the second lateral edge of both the anterior portion and the posterior portion extending from the upper skirt end toward the lower skirt end.

8. The emergency quick deploy full body bee suit as claimed in claim 7 comprising:
the pair of leg portions comprising a first leg portion and a second leg portion;
the first lateral edge of the anterior portion and the first lateral edge of the posterior portion of the skirt being removably attached to the full body suit adjacent to the lower torso end and around the first leg portion; and
the second lateral edge of the anterior portion and the second lateral edge of the posterior portion of the skirt being removably attached to the full body suit adjacent to the lower torso end and around the second leg portion.

9. The emergency quick deploy full body bee suit as claimed in claim 7 comprising:
the first lateral edge of the anterior portion and the first lateral edge of the posterior portion of the skirt being removably attached to the full body suit adjacent to the lower torso end and around the first leg portion via hook and loop tape; and
the second lateral edge of the anterior portion and the second lateral edge of the posterior portion of the skirt being removably attached to the full body suit adjacent to the lower torso end and around the first leg portion via hook and loop tape.

10. The emergency quick deploy full body bee suit as claimed in claim 7, wherein the first lateral edge of the anterior portion and the first lateral edge of the posterior portion adjoin between the upper skirt end and the lower skirt end, and wherein the second lateral edge of the anterior portion and the second lateral edge of the posterior portion adjoin between the upper skirt end and the lower skirt end.

11. The emergency quick deploy full body bee suit as claimed in claim 1 comprising:
the skirt fastening mechanism comprising a first skirt zipper portion and a second skirt zipper portion; and
the first skirt zipper portion and the second skirt zipper portion being positioned terminally and serially adjacent to each other, wherein the first skirt zipper portion and the second skirt zipper portion are configured to perimetrically and internally traverse along the lower skirt opening, and
wherein the first skirt zipper portion and the second skirt zipper portion are configured to be selectably engaged with each other in order to close the lower skirt opening.

12. The emergency quick deploy full body bee suit as claimed in claim 1 comprising:
the skirt fastening mechanism comprising a first skirt zipper portion and a second skirt zipper portion;
the first skirt zipper portion extending perimetrically and internally along the lower skirt opening adjacent to an anterior portion of the skirt;
the second skirt zipper portion extending perimetrically and internally along the lower skirt opening adjacent to a posterior portion of the skirt; and
the first skirt zipper portion and the second skirt zipper portion being configured to be selectably engaged with each other in order to close the lower skirt opening.

13. The emergency quick deploy full body bee suit as claimed in claim 1 comprising:
the suit fastening mechanism comprising a first pair of suit zipper portions and a second pair of suit zipper portions; and
the first pair of suit zipper portions and the second pair of suit zipper portions being configured to be selectably engaged with each other in order to close the ingress opening of the full body suit.

14. The emergency quick deploy full body bee suit as claimed in claim 13 comprising:
a zipper apex;
the zipper apex being positioned laterally central on the torso portion at the lower torso end;
each of the pair of leg portions comprising an anterior internal edge and a posterior internal edge;
the anterior internal edge and the posterior internal edge of each of the pair of leg portions each extending from the torso portion adjacent to the lower torso end along a respective one of the pair of leg portions toward a respective one of the pair of foot portions,
wherein the ingress opening is delineated by the anterior internal edges and posterior internal edges of the pair of leg portions;
the anterior internal edges of the pair of leg portions adjoining with each other adjacent to the lower torso end of the torso portion;
the posterior internal edges of the pair of leg portions adjoining with each other adjacent to the lower torso end of the torso portion;
each of the first pair of suit zipper portions being connected to the full body suit along the anterior internal edge of one of the pair of leg portions;
each of the second pair of suit zipper portions being connected to the full body suit along the posterior internal edge of one of the pair of leg portions;

each of the first pair of suit zipper portions being configured to be selectably engaged with a corresponding one of the second pair of suit zipper portions; and the first pair of suit zipper portions and the second pair of suit zipper portions each terminating adjacent to the zipper apex, wherein the ingress opening is closed when the first pair of suit zipper portions and the second pair of suit zipper portions are engaged with each other, and wherein the first pair of suit zipper portions and the second pair of suit zipper portions are in a closed configuration when the first pair of suit zipper portions and the second pair of suit zipper portions are engaged with each other.

15. The emergency quick deploy full body bee suit as claimed in claim 14 comprising:

a zipper anchor;

the zipper anchor being internally connected to the torso portion adjacent to the zipper apex, and wherein the zipper anchor is configured to secure the first pair of suit zipper portions and the second pair of suit zipper portions in the closed configuration.

16. The emergency quick deploy full body bee suit as claimed in claim 15, wherein the zipper anchor is constructed of an elastically deformable material.

17. The emergency quick deploy full body bee suit as claimed in claim 15, wherein the zipper anchor is an expanded polystyrene foam plug.

18. The emergency quick deploy full body bee suit as claimed in claim 1 comprising:

a pair of flared armpit portions; and each of the pair of flared armpit portion being connected adjacent to and between a respective one of the pair of arm portions and the torso portion.

\* \* \* \* \*